United States Patent
Hopf et al.

(10) Patent No.: US 7,610,798 B1
(45) Date of Patent: Nov. 3, 2009

(54) METHOD OF DETERMINING MISFIRING

(75) Inventors: Thomas Hopf, Bensheim (DE); Ulrich Staufenberg, Diethardt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/269,148

(22) PCT Filed: Apr. 24, 1997

(86) PCT No.: PCT/EP97/02086

§ 371 (c)(1),
(2), (4) Date: Jul. 6, 2001

(87) PCT Pub. No.: WO98/11416

PCT Pub. Date: Mar. 19, 1998

(30) Foreign Application Priority Data

Sep. 12, 1996 (DE) .................................. 196 37 094

(51) Int. Cl.
*G01M 15/11* (2006.01)
(52) U.S. Cl. .................................. 73/114.03
(58) Field of Classification Search .............. 73/114.02, 73/114.03, 114.04, 114.05, 114.08, 114.26, 73/114.27

See application file for complete search history.

(56) References Cited

U.S. PATENT DOCUMENTS 5,144,927 A * 9/1992 Denz .................. 73/114.03

FOREIGN PATENT DOCUMENTS

| DE | 4119399 | 1/1992 |
| DE | 4028131 | 3/1992 |
| WO | 9209875 | 6/1992 |

* cited by examiner

*Primary Examiner*—Eric S McCall
(74) *Attorney, Agent, or Firm*—Lucas & Mercanti, LLP; Klaus P. Stoffel

(57) ABSTRACT

A method for the determination of combustion misfires in an internal combustion engine having a plurality of cylinders, there being provision, for determining at least two successive compression times and expansion times for at least one cylinder of the internal combustion engine, for the determination of combustion misfires a comparison of the change in the compression times with the change in the expansion times being carried out, and the result of the comparison being a measure of a combustion misfire.

10 Claims, 5 Drawing Sheets

METHOD OF DETERMINING MISFIRING

FIELD AND BACKGROUND OF THE INVENTION

The invention relates to a method for the determination of combustion misfires in an internal combustion engine having a plurality of cylinders.

A diagnostic device for internal combustion engines is known from DE 41 19 399 C2, said diagnostic device, whilst having a simplified design, making it possible to detect ignition or combustion problems in internal combustion engines more reliably. This is due to the presence of pressure detection means (sensors) which detect the internal pressure of the cylinders of the internal combustion engine and emit a corresponding output signal, this output signal being fed to a differentiating means which differentiates the output signal and emits a differentiated output signal. The disadvantage of this diagnostic device is that pressure detection means are necessary for detecting the internal pressure of the cylinders of the internal combustion engine, thus necessitating additional design measures on the crankcase of the internal combustion engine, with the result that a higher outlay in terms of assembly is involved and there is a source of sealing faults. Moreover, the pressure detection means are subjected to increased requirements, particularly as regards thermal resistance, so that these pressure detection means are correspondingly cost-intensive.

SUMMARY OF THE INVENTION

The object on which the invention is based, therefore, is, by simple means, to provide a method by which the combustion misfires in at least one cylinder of the internal combustion engine can be determined reliably.

It is known that braking of the crankshaft of the internal combustion engine occurs in the case of combustion misfires. This braking can be detected by measuring the variation in successive 180° times. However, the braking (negative acceleration) of the crankshaft is not sufficient, alone, for recognizing combustion misfires or for distinguishing them from other influences which cause negative angular acceleration of the crankshaft (for example, influences arising from the drive train of a vehicle in which the internal combustion engine is arranged). Consequently, in order to determine combustion misfires, it is provided, according to the invention, that the crank circle of the crankshaft (that is to say, one revolution) be divided into four regions (segments), each of 90° in the case of a four-cylinder internal combustion engine, so that two compression times and two expansion times occur during each revolution. In a six-cylinder internal combustion engine, the division into six segments, each of 60°, that is to say, in general, a crank circle (360°) is divided by the number of cylinders of the internal combustion engine, thus resulting in the division into segments and the segment size. The determination of the combustion misfire is based on determining at least two successive compression times and expansion times for at least one cylinder of the internal combustion engine, and, in order to determine combustion misfires, a comparison, in particular an addition or a subtraction, of the change in the compression times with the change in the expansion times is carried out and the result of the comparison is a measure of a combustion misfire. If the comparison result exceeds (or falls short of) an upper (lower) predeterminable limit value once or more than once, this is indicated optically and/or acoustically after statistic further processing and can be stored in a fault memory, and, furthermore, the supply of the fuel to this cylinder can be interrupted (for example, the corresponding injection valves are deactivated), whilst further reactions may also be carried out (for example, blocking of λ-control and of full-load enrichment).

In a development of the invention, the method is carried out as a function of predeterminable parameters of the internal combustion engine and/or of predeterminable ambient parameters of the internal combustion engine. Thus, for example, the method is not carried out as a function of the operating temperature of the internal combustion engine or is so carried out, using predeterminable limit values. The predeterminable ambient parameters of the internal combustion engine are, for example, acceleration and deceleration operations of the vehicle, since these have a direct effect on the measured expansion and compression times and the 180° times due to the changes in engine speed, so that these ambient influences are taken into account in the determination of combustion misfires.

It is advantageous, furthermore, that the availability of the comparison result makes it directly possible to have evidence as to whether there is a combustion misfire or not and, on the basis of this, a rapid reaction (for example, fault warning, interruption in the fuel supply or the like) can take place or takes place either after a single combustion misfire or after a plurality of successive combustion misfires.

In a development of the invention, the method is carried out for each cylinder, so that combustion misfires are determined and recognized for each individual cylinder and the affected cylinder can be at least temporarily deactivated by interrupting the fuel supply, so that, at all events, emergency operation is still ensured if an individual cylinder has combustion misfires not only temporarily, but permanently.

In a development of the invention, after the detection of at least one combustion misfire, in particular after a predeterminable number of combustion misfires, on a cylinder, a fault signal is generated and emitted. This fault signal, which may also be stored in a memory unit of the engine control device, signals to the vehicle driver that there is a defect and that he should find a workshop in order to eliminate it and avoid further damage (in particular, to a catalyst which is destroyed by fuel which is not burnt).

The method according to the invention is explained in more detail below, a device for carrying out the method also being described, the invention not being restricted to this device.

BRIEF DESCRIPTION OF THE DRAWINGS

With the above and other objects in view, the invention will be understood from the accompanying description of a preferred embodiment when considered with the accompanying drawings, of which

DETAILED DESCRIPTION OF THE PREFERRED EMBODIMENT

Figure 1:
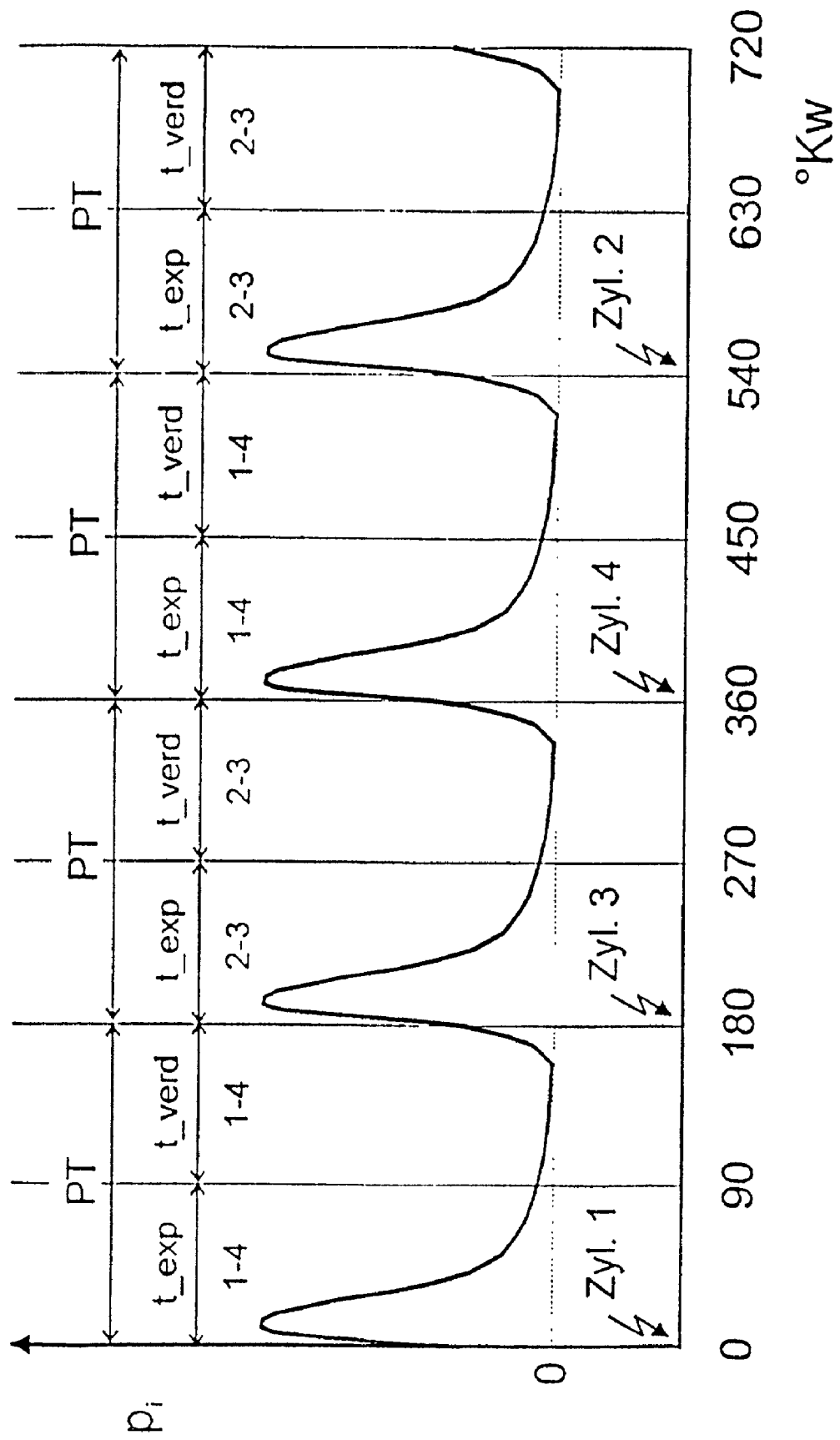
FIG. 1 shows a cylinder pressure profile of a four-cylinder internal combustion engine, with the 90° and 180° crankshaft times being illustrated.

FIG. 1 shows the cylinder pressure profile of a four-cylinder internal combustion engine, with the 90° and 180° crankshaft times being illustrated. The crank circle is divided into four segments, each of 90°, for example the zero position being at the ignition TDC of the first and of the fourth cylinder, so that two compression times ($t_{\_verd}$) and expansion times ($t_{\_exp}$) occur during each revolution. The period (PT) can be formed from the sum of a compression time and the associated expansion time between two successive TDC's of various cylinders. Advantageously, in this case, the method for the determination of combustion misfires is carried out as a function of predeterminable ambient parameters of the internal combustion engine, these being, in addition to those already mentioned, the output signal from the sensor for determining the period. This is carried out, for example, by comparing two successive 180° times (or the like) with one another. Since this takes place in the nonstationary mode, these measured times must be essentially identical, and, for example, the difference resulting from the differentiation of the two times can be taken into account in the further method for the determination of combustion misfires. Consequently, in particular, manufacturing tolerances, tooth flank errors and the like of the sensor are compensated.

Figure 2:
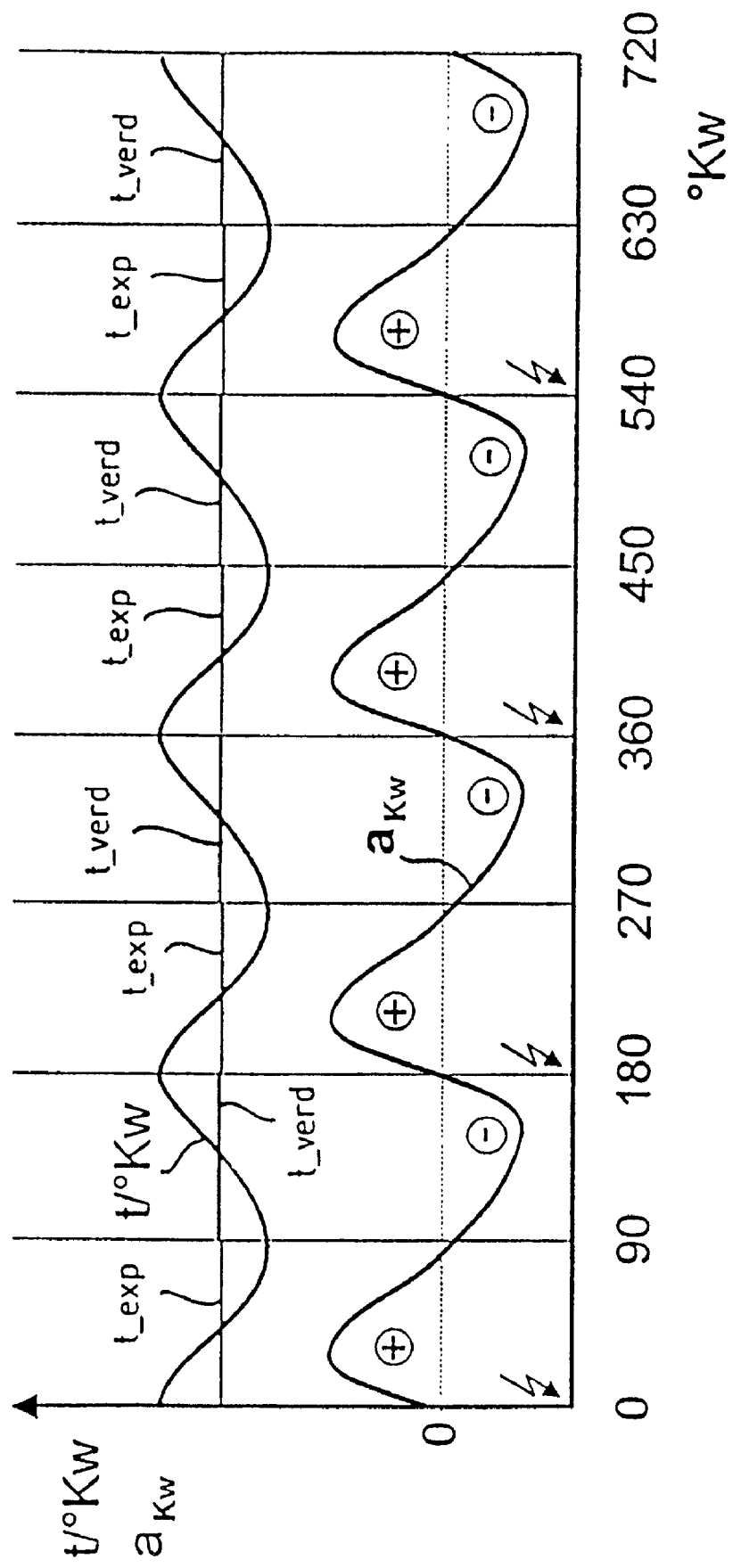
FIG. 2 shows a profile of the crankshaft acceleration and of the 90° times during normal engine operation.

FIG. 2 shows the profile of the crankshaft acceleration and of the 90° times during normal engine operation. It can be seen, here, that the acceleration of the crankshaft is positive during an expansion time, whereas it is negative during the compression time. During normal engine operation, positive and negative accelerations alternate.

Figure 3:
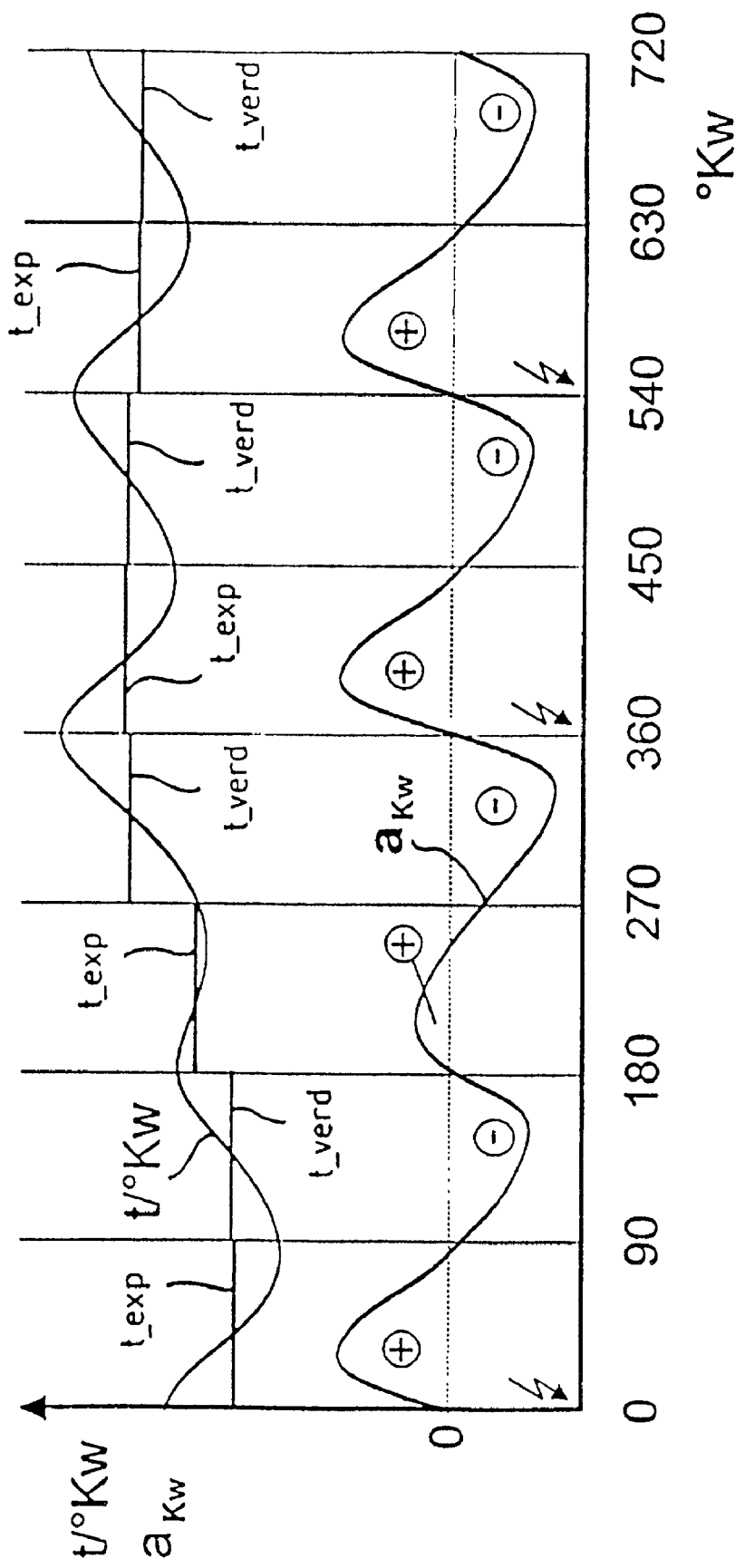
FIG. 3 shows the change in the crankshaft acceleration and in the 90° times which is caused by combustion misfires.

FIG. 3 shows, in contrast to FIG. 2, changes in the crankshaft acceleration and in the 90° times which are caused by combustion misfires. A combustion misfire (between a 180° crank angle and a 270° crank angle) results in lower positive acceleration and higher negative acceleration of the crankshaft. The following compression and expansion times also change as a result, so that they are at a higher level than before.

Figure 4:
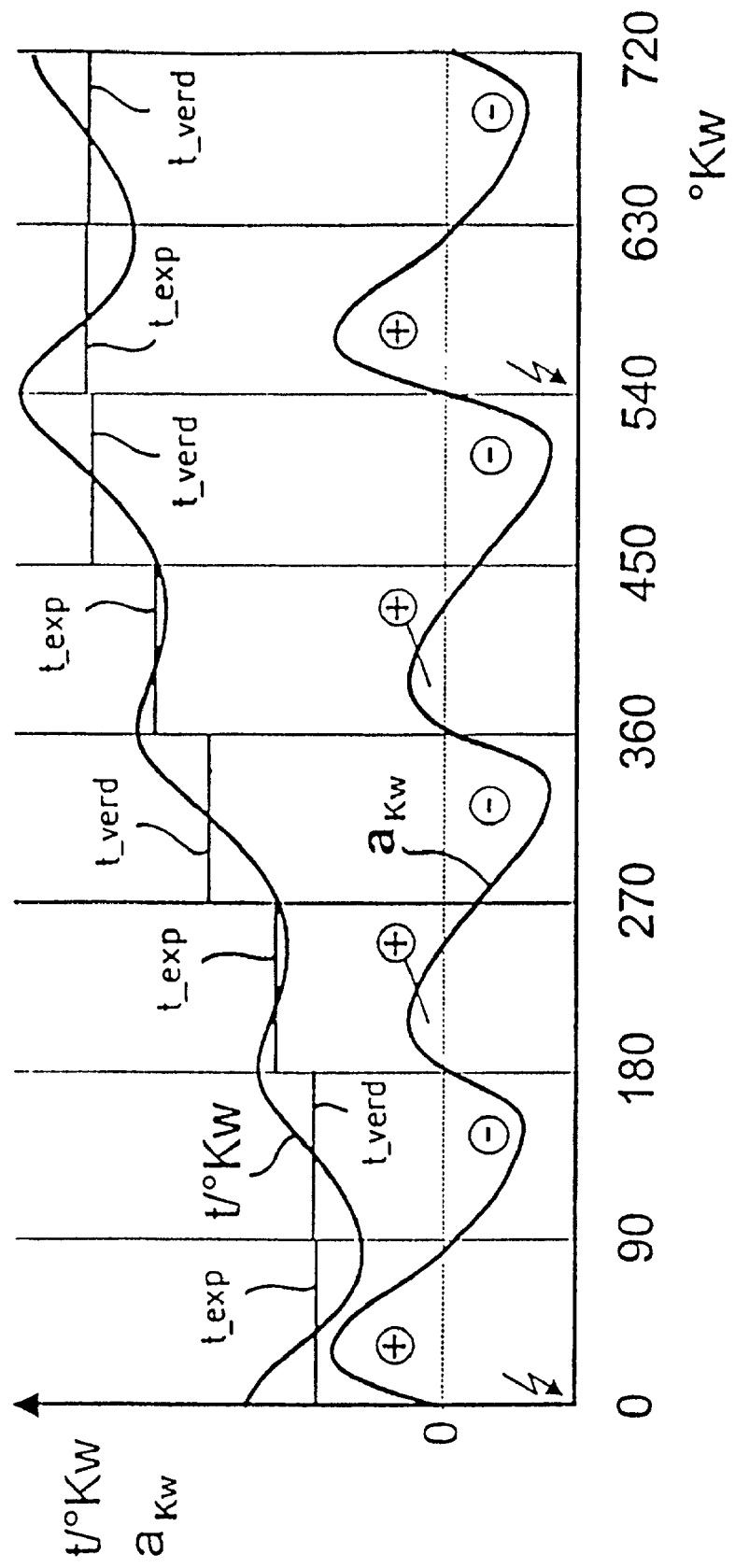
FIG. 4 shows the change in the crankshaft acceleration and in the 90° times which is caused by double misfires.

FIG. 4 shows the change in the crankshaft acceleration and in the 90° times which is caused by double misfires. The lower positive acceleration or the higher negative acceleration of the crankshaft results, in the subsequent time, in a further rise of the compression and expansion times which can likewise be evaluated, in exactly the same way as in FIG. 3, by means of the method according to the invention.

Figure 5:
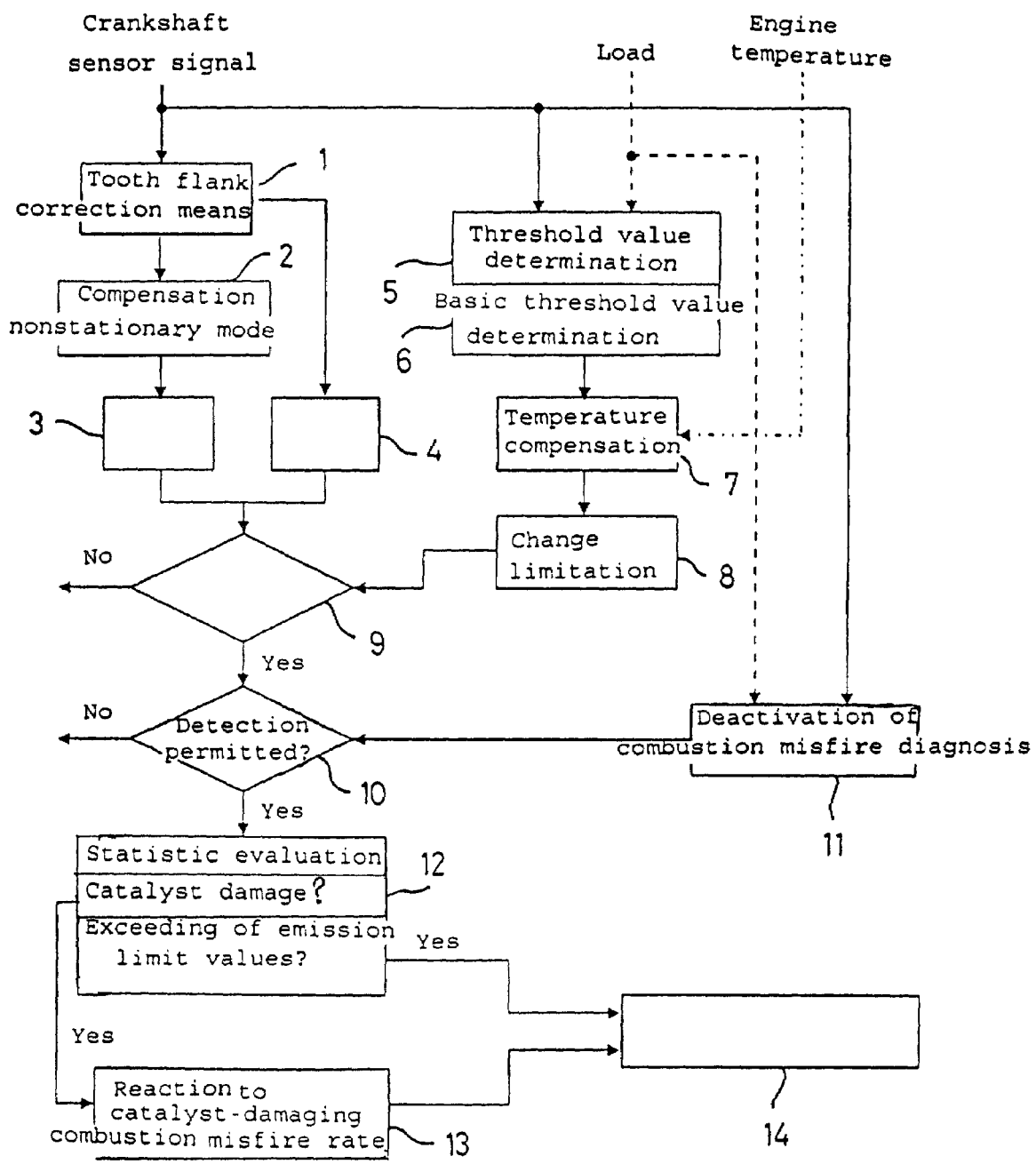
FIG. 5 shows a device for evaluating and processing the combustion misfires recognized.

FIG. 5 shows a device for evaluating and processing recognized combustion misfires.

A crankshaft sensor signal (a camshaft sensor signal may also be envisaged) is fed to a tooth flank correction means 1, in which, as already described, two successive 180° times and associated 90° times (two expansion and compression times) are compared with one another and a value is formed which is taken into account in the following combustion misfire determination. Compensation 2 is subsequently carried out during the nonstationary mode, so that, for example in the case of a sudden load decrease (gas throttling), which is also superposed by a likewise rapid engine speed change due to vibrations in the drive train, a combustion misfire would be recognized, but would not constitute a combustion misfire. The formation of a characteristic value for the combustion misfire is designated by the reference numeral 3, the formation of further value, without the nonstationary mode being taken into account, being formed from the crankshaft sensor signal at reference numeral 4. One of the two or both values can be read out, with limited change, from a characteristic map plotted, in particular, against load and engine speed, one value being capable of correcting the other. Reference numeral 5 designates threshold value determination, in which a threshold value or a value range, if appropriate taking into account the load in the internal combustion engine, is formed for the value formed in 4. Threshold value determination 6 is likewise carried out, in which a basic threshold value or a value range is determined for the combustion misfire value formed at 3. Temperature compensation 7, which takes the engine temperature into account, may be carried out for one or both threshold values 5, 6. In a change limitation means 8, these threshold values or one threshold value can be taken into account as a function of predeterminable parameters of the internal combustion engine and/or of predeterminable ambient parameters of the internal combustion engine, such as, for example, an abrupt change in the accelerator pedal position, sharp vibration excitation caused by terrain influences or the like.

An interrogation means 9 interrogates whether a combustion misfire is to be determined or not. If the combustion misfire values determined in 3 or 4 are above or below the determined threshold values 5 or 6 (or outside the permissible value range), no determination of combustion misfires is carried out. If determination is to be carried out, an interrogation means 10 interrogates whether detection is permitted or not. Thus, for example, detection is not permitted when the speed of the internal combustion engine is below a predeterminable speed (for example, a minimum speed below idling speed), or predeterminable load and/or temperature ranges are not maintained. If, for example, the engine temperature is below a predeterminable temperature, inhomogeneous mixture treatment and a marked increase in friction-related power output at these temperatures result in increased running noise, which assumes orders of magnitude, which is also to be expected in the case of combustion misfires. Below this temperature, therefore, there is no detection of combustion misfires, so that deactivation 11 of the combustion misfire diagnosis is carried out.

When detection 10 is permitted, statistic evaluation 12 takes place, as to whether the combustion misfire or combustion misfires may lead to catalyst damage and/or to emission limit values being exceeded. If catalyst damage may occur, a reaction 13 to a catalyst-damaging combustion misfire rate is carried out, for which purpose, for example, the respective cylinder which has combustion misfires is cut out. Furthermore, as a result of this and also as a result of emission limit values being exceeded, a fault signal is generated, which is indicated to the vehicle driver optically/acoustically, is stored in an on-board diagnostic device and is read out later or as a function of which the supply fuel to the affected cylinder or cylinders is at least temporarily interrupted.

List of the Abbreviations Used

| | |
|---|---|
| TDC: | Top dead center of a cylinder |
| ° KW: | Angular sector which the crankshaft of the internal combustion engine covers |
| ⚡Zyl.i: | The ignition timing of a cylinder (i = 1, 2, 3, 4, etc.) |
| $t_{\_exp}$: | Expansion time of a cylinder |
| $t_{\_verd}$: | Compression time of a cylinder |
| PT: | Period for an angular sector |
| $a_{KW}$: | Acceleration of the crankshaft |
| VA: | Combustion misfire |

$$VA = \frac{t_{\_verd,i} - t_{\_verd,i-1}}{t_{\_exp,i} - t_{\_exp,i-1}}$$

$$= \frac{\Delta t_{\_verd}}{\Delta t_{\_exp}}$$

or:
$$VA = \Delta t_{\_verd} - \Delta t_{\_exp}$$

We claim:

1. A method for the determination of combustion misfires in an internal combustion engine having a plurality of cylinders, comprising the steps of:
(a) measuring at least two successive compression times and expansion times for a cylinder;
(b) forming the difference between compression times for said cylinder;
(c) forming the difference between expansion times for said cylinder; and
(d) forming the difference between the differences calculated in steps (b) and (c), wherein this difference provides a measure of a combustion misfire.

2. The method as claimed in claim 1, the method being carried out for each cylinder of the internal combustion engine.

3. The method as claimed in claim 1, wherein, after the detection of a predefined number of combustion misfires, a fault signal is generated and emitted.

4. The method as claimed in claim 1, wherein a threshold value for the measure of a combustion misfire is formed at least as a function of at least one parameter of the internal combustion engine, no fault signal being generated if the comparison result exceeds or falls short of this threshold value.

5. The method as claimed in claim 1, wherein the method is carried out as a function of operating parameters of the internal combustion engine and/or of ambient parameters of the internal combustion engine.

6. The method as claimed in claim 5, wherein the method is not carried out in the case of a deviation from permissible value ranges for operating parameters of the internal combustion engine and/or for operating ambient parameters of the internal combustion engine.

7. The method as claimed in claim 1, used in an on-board diagnostic device at least for the internal combustion engine driving a vehicle.

8. The method of claim 1, wherein the vehicle is a passenger vehicle.

9. A method for the determination of combustion misfires in an internal combustion engine having a plurality of cylinders, comprising the steps of:
(a) measuring at least two successive compression times and expansion times for at least two cylinders;
(b) forming the difference between compression times for said cylinder;
(c) forming the difference between expansion times for said cylinder; and
forming the difference between the differences calculated in steps (b) and (c), wherein this difference provides a measure of a combustion misfire wherein the step of measuring successive compression times are carried out on two cylinders, with one cylinder providing a first compression time and the other cylinder providing a second compression time; and
the step of measuring successive expansion times are carried out on these same two cylinders, with one cylinder providing one expansion time and the other cylinder providing a second expansion time.

10. A method for the determination of combustion misfires in an internal combustion engine having a plurality of cylinders, wherein at least two successive compression times and expansion times are determined and the ratio of a difference in compression times to a difference in expansion times is computed for at least one cylinder of the internal combustion engine, for the determination of combustion misfires a comparison of the change in the compression times with the change in the expansion times being carried out, and the result of the comparison being a measure of a combustion misfire.

* * * * *